United States Patent [19]

Stephany et al.

[11] Patent Number: 5,686,769

[45] Date of Patent: Nov. 11, 1997

[54] METHOD OF COIL MOUNTING FOR MAXIMUM HEAT TRANSFER IN BRUSHLESS DC MOTORS

[75] Inventors: Thomas M. Stephany, Churchville; Gary R. Kenny; James K. Lee, both of Rochester, all of N.Y.

[73] Assignee: Eastman Kodak Company, Rochester, N.Y.

[21] Appl. No.: 451,869

[22] Filed: May 26, 1995

[51] Int. Cl.[6] .................. H02K 1/32; H02K 3/24; H02K 5/18
[52] U.S. Cl. .................. 310/64; 310/68 R; 310/268; 360/99; 361/704; 361/707; 361/715
[58] Field of Search .................. 310/268, 68 R, 310/64; 360/99; 361/704, 707, 715

[56] References Cited

U.S. PATENT DOCUMENTS

| | | | |
|---|---|---|---|
| 4,007,390 | 2/1977 | Muller et al. | 310/90 |
| 4,008,409 | 2/1977 | Rhudy et al. | 310/45 |
| 4,093,897 | 6/1978 | Fujita et al. | 218/138 |
| 4,109,170 | 8/1978 | Fujita et al. | 310/68 R |
| 4,260,920 | 4/1981 | Nakamura et al. | 310/156 |
| 4,336,475 | 6/1982 | Morinaga et al. | 310/198 |
| 4,658,162 | 4/1987 | Koyama et al. | 310/68 R |
| 4,733,115 | 3/1988 | Barone et al. | 310/68 R |
| 4,737,675 | 4/1988 | Maemine et al. | 310/268 |
| 4,763,037 | 8/1988 | Hashimoto et al. | 310/268 |
| 4,851,731 | 7/1989 | Saotome et al. | 310/258 |
| 4,858,073 | 8/1989 | Gregory | 361/388 |
| 5,003,429 | 3/1991 | Baker et al. | 361/386 |
| 5,039,895 | 8/1991 | Meister | 310/68 |
| 5,124,863 | 6/1992 | Koizumi et al. | 360/99.08 |
| 5,295,044 | 3/1994 | Araki et al. | 361/709 |

FOREIGN PATENT DOCUMENTS 50-111156  9/1975  Japan.
63-299757  5/1987  Japan.

Primary Examiner—Clayton E. LaBalle
Assistant Examiner—Elvin G. Enad
Attorney, Agent, or Firm—Thomas H. Close

[57] ABSTRACT

A flat brushless motor of small size comprising:
  a thermally conductive base member;
  a plurality of motor coils fixedly attached to said base member; and
  a rotor assembly mounted proximately to said plurality of motor coils said motor assembly having a multiple pole permanent magnet incorporated therein.

8 Claims, 3 Drawing Sheets

METHOD OF COIL MOUNTING FOR MAXIMUM HEAT TRANSFER IN BRUSHLESS DC MOTORS

FIELD OF INVENTION

The present invention is related to the field of brushless motors and more particularly to an improved arrangement of a brushless motor that facilitates the removal of heat permitting an increase in coil current.

BACKGROUND OF THE INVENTION

Brushless DC motors are commonly used in a variety of products from applications as precise as scanner motors, to items as simple as pumps. As the size of a motor is decreased its output torque capability is also decreased. This obviates that coil size in a brushless motor is also limited. Since large diameter wire is difficult to use with small coils decreasing the resistance of the coils is somewhat difficult. From the power formula $I^2R$ it is also obvious that increasing the motor current in an effort to increase torque also increases the power dissipation. Therefore, with small motor sizes, it becomes increasingly important to remove the heat which is generated by the transmission of power from the motor to the load.

Since an increase in coil temperature will increase coil resistance, and consequently will decrease current in the coil, it becomes necessary to remove heat thereby allowing an increase in current. The present invention is directed towards maintaining the relatively small size of a flat brushless motor while maximizing output torque.

SUMMARY OF THE INVENTION

The present invention is directed to overcoming one or more of the problems set forth above. Briefly summarized, according to one aspect of the present invention there is provided a flat brushless motor of small size comprising:

a thermally conductive base member;

a plurality of motor coils located adjacent to said base member;

a thermally conductive deformable layer positioned between said plurality of motor coils and said base member to facilitate the transfer of heat from said plurality of motor coils to said base member; and a rotor assembly mounted proximately to said plurality of motor coils said rotor assembly having a multiple pole permanent magnet incorporated therein.

The intent of this invention is to show an alternate way of constructing the motor elements in a way such that the circuit board and coils are turned upside down and a thermally conductive deformable layer is positioned between the motor coils and the base member so that the motor coils are in thermal contact with the flux return plate or a heat conductive material attached thereto. The purpose of this arrangement is to enable maximum heat transfer away from the motor coils. Thus accomplished, this efficient heat transfer negates any buildup of waste heat from the motor, permitting better operation.

The invention hereby discloses a novel means of motor construction for maximum efficiency of heat transfer, permitting an uncomplicated and low cost solution to a sometimes insurmountable problem. Utilization of this method of construction can often "make or break" a motor design which requires a large operating torque, and a small mechanical package.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The invention discloses a novel means of motor construction for maximum efficiency of heat transfer, permitting an uncomplicated and low cost solution to a sometimes insurmountable problem. Utilization of this method of construction can often "make or break" a motor design which requires a large operating torque, and a small mechanical package.

DETAILED DESCRIPTION OF THE INVENTION

Figure 1:
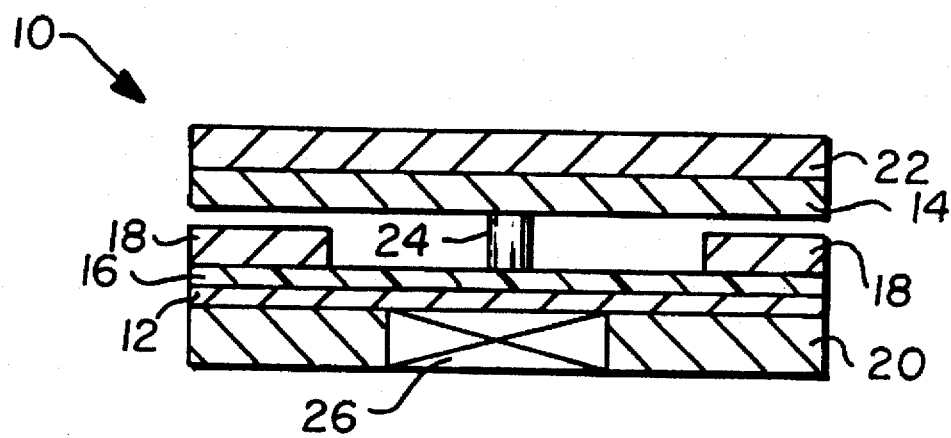
FIG. 1 illustrates, in cross section view, a Prior Art example of a flat brushless D.C. motor.
Figure 2:
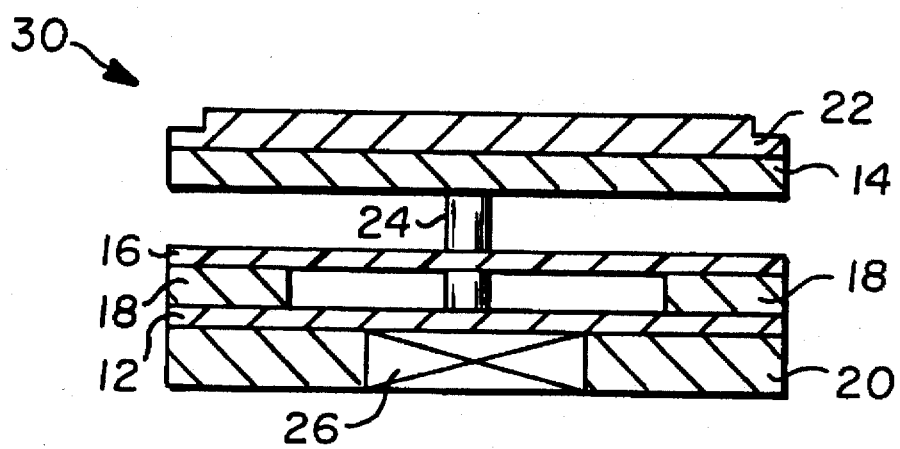
FIG. 2 illustrates, in cross section view, the preferred embodiment of a flat brushless D.C. motor.

Referring to the prior art motor 10 illustrated in FIG. 1, it is common practice for brushless DC motors to be constructed with a flux return plate 12 that may be formed from silicon steel, to provide a flux return path for the motor magnet 14 and a circuit board 16 with the motors' coils 18 mounted to the circuit board 16. It should be noted that the flux return plate 12 can be separate from, or integrated with a motor base 20. It should also be noted that the motor magnet 14 is capped by a rotor 22 which is constructed with a magnetic material that effectively directs the flux stored in motor magnet 14 through the motor coils 18. The correct application of current through motor coils 18 will cause a rotation of the motor on a bearing 26 through a shaft 24 which is rigidly attached to the rotor 22. This prior art arrangement suffers from the creation of excess heat especially on motors that are extremely small, but are required to generate large amounts of torque. The reason that the excess heat is formed is that the coils 18 do not have an effective heat sink path.

The improved motor 30 has its motor coils 18 and circuit board 16 inverted so that the motor coils are in contact with flux return plate 12. This arrangement increases the heat transfer from the coils 18 to the flux return plate 12 which is a much more efficient heat sink than air. The motor coils 18 may be fixedly attached to the flux return plate 12 with a thermal paste or like material to further increase thermal transfer. Since the circuit board material is magnetically permeable, motor performance is largely unaffected except for a slight increase in the flux gap due to the thickness of the circuit board, and a reversal of motor commutation.

Figure 3:
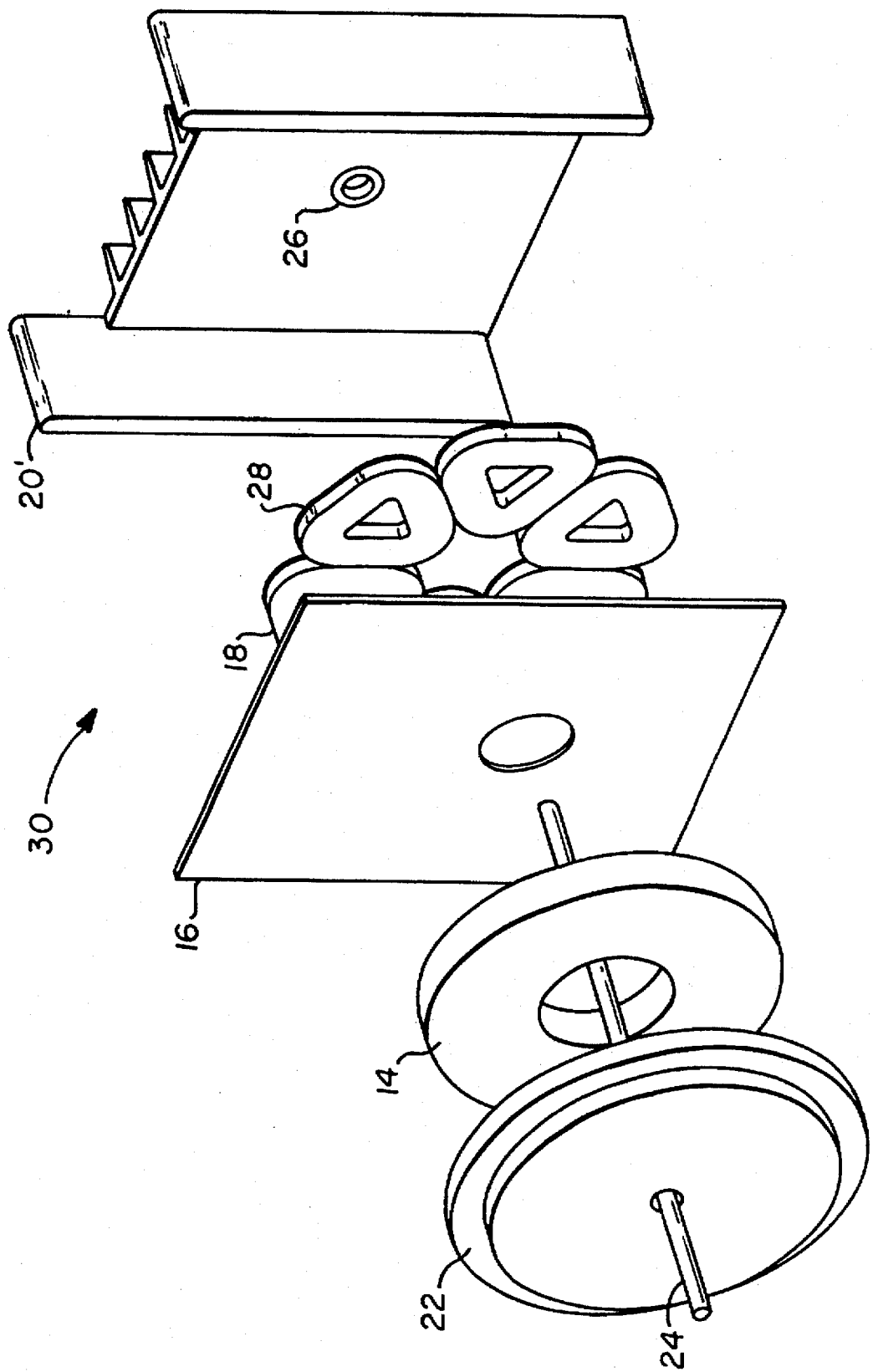
FIG. 3 illustrates, in an exploded perspective view the preferred embodiment of the flat brushless D.C. motor of FIG. 2.
Figure 4:
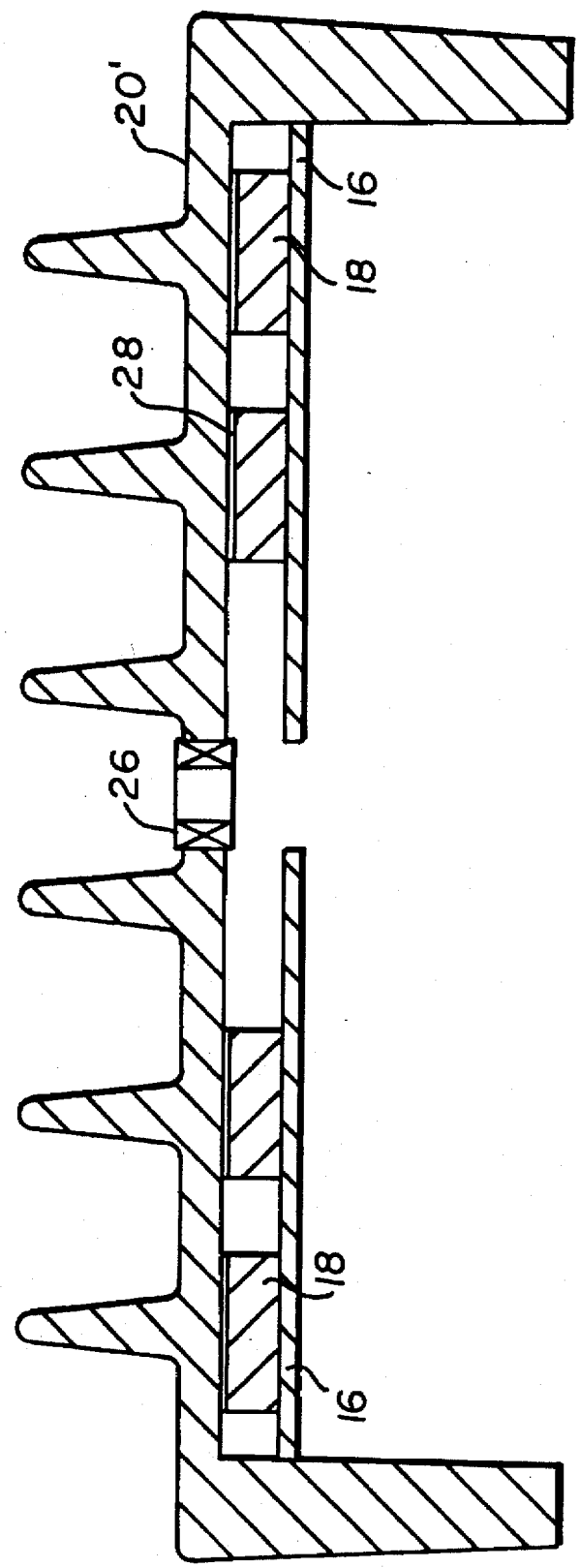
FIG. 4 illustrates in a section view the mounting of the coil to the heat sink.

Referring to FIGS. 3 and 4, the motor 30 is shown comprised of the motor coils 18 being positioned for assembly onto a finned heat sink 20'. The heat sink 20', serves as the motor base 20 and the flux plate 12 and also supports the bearing 26. A thermally conductive deformable layer 28 is positioned between the motor coils 18 and the finned heat sink member 20' to facilitate the transfer of heat from the motor coils to the heat sink member 20'. For example, the thermally conductive deformable layer 28 may comprise a thermal paste which is applied between coil 18 and the finned heat sink 20' to significantly enhance the transfer of heat from the motor coils 18 to the finned heat sink 20'. Alternatively, the thermally conductive deformable layer 28 may comprise an electrically insulating, thermally conductive plastic layer. This configuration, through the enhanced transfer of heat, prevents the increase in resistance of the motor coils due to heating and negates the requirement of increasing the drive current in response to increased coil resistance thus stabilizing motor operation.

The invention has been described with reference to a preferred embodiment. However, it will be appreciated that variations and modifications can be effected by a person of ordinary skill in the art without departing from the scope of the invention.

PARTS LIST

10 Prior Art Motor
12 Flux Return Plate
14 Motor Magnet
16 Circuit Board
18 Motor Coils
20 Motor Base
20' Finned Heat Sink
22 Rotor
24 Shaft
26 Bearing
28 Thermal Paste
30 Improved Motor

What is claimed is:

1. A flat brushless motor of small size comprising:

a thermally conductive base member, the base member serving as a flux plate for the motor;

a plurality of motor coils located adjacent to said base member;

a thermally conductive deformable layer positioned between said plurality of motor coils and said base member to facilitate the transfer of heat from said plurality of motor coils to said base member; and a rotor assembly mounted proximately to said plurality of motor coils said rotor assembly having a multiple pole permanent magnet incorporated therein.

2. The motor according to claim 1 wherein said thermally conductive deformable layer is a thermal paste.

3. The motor according to claim 1 wherein said thermally conductive deformable layer is an electrically insulating thermally conductive plastic.

4. The motor according to claim 1 wherein said thermally conductive base member is formed with a plurality of heat transmitting fins to facilitate the removal of heat from said plurality of motor coils.

5. A motor of small size comprising:

a heat sinking motor body member, serving as a flux plate;

a plurality of motor coils located adjacent to said body member;

a thermally conductive deformable layer positioned between said plurality of motor coils and said motor body member to facilitate the transfer of heat from said plurality of motor coils to said motor body member;

a rotor assembly mounted proximately to said plurality of motor coils; and means for applying current to said plurality of motor coils so as to rotate said rotor assembly.

6. The motor according to claim 5 wherein said thermally conductive deformable layer is a thermal paste.

7. The motor according to claim 5 wherein said thermally conductive deformable layer is an electrically insulating thermally conductive plastic.

8. The motor according to claim 5 wherein said heat sinking motor body member is formed with a plurality of heat transmitting fins to facilitate the removal of heat from said plurality of motor coils.

* * * * *